(12) United States Patent
Nakahara et al.

(10) Patent No.: US 7,838,076 B2
(45) Date of Patent: Nov. 23, 2010

(54) THERMOSETTING AQUEOUS PAINT COMPOSITION

(75) Inventors: Shuichi Nakahara, Hiratsuka (JP); Hiromi Harakawa, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 300 days.

(21) Appl. No.: 11/662,134

(22) PCT Filed: Sep. 7, 2005

(86) PCT No.: PCT/JP2005/016876

§ 371 (c)(1),
(2), (4) Date: Mar. 8, 2007

(87) PCT Pub. No.: WO2006/028262

PCT Pub. Date: Mar. 16, 2006

(65) Prior Publication Data

US 2008/0095944 A1    Apr. 24, 2008

(30) Foreign Application Priority Data

Sep. 9, 2004   (JP) .............................. 2004-261850

(51) Int. Cl.
  *C08G 63/02*   (2006.01)
  *B05D 3/00*    (2006.01)
(52) U.S. Cl. .................... 427/385.5; 525/451; 523/501; 524/458; 524/457; 524/501; 524/512; 524/513
(58) Field of Classification Search .............. 427/385.5
  See application file for complete search history.

(56) References Cited

U.S. PATENT DOCUMENTS

| | | | |
|---|---|---|---|
| 4,314,918 A | 2/1982 | Birkmeyer et al. | |
| 5,322,865 A * | 6/1994 | Inoue et al. | 523/501 |
| 5,597,861 A * | 1/1997 | Nakae et al. | 524/601 |
| 5,693,724 A | 12/1997 | Green | |
| 5,994,479 A | 11/1999 | Green et al. | |
| 6,117,931 A | 9/2000 | Rehfuss et al. | |
| 2003/0055163 A1 | 3/2003 | Urata et al. | |
| 2003/0069439 A1 | 4/2003 | Isaka | |
| 2003/0119980 A1 | 6/2003 | Ogawa et al. | |

FOREIGN PATENT DOCUMENTS

| | | |
|---|---|---|
| JP | 10-101992 | 4/1998 |
| JP | 11-236528 | 8/1999 |
| JP | 2003-012999 | 1/2003 |
| JP | 2003-055313 | 2/2003 |
| JP | 2003-119410 | 4/2003 |
| WO | 99/35198 | 7/1999 |

* cited by examiner

*Primary Examiner*—Michael Barr
*Assistant Examiner*—Ryan Schiro
(74) *Attorney, Agent, or Firm*—Wenderoth, Lind & Ponack, L.L.P.

(57) ABSTRACT

The present invention discloses a thermosetting aqueous paint, comprising an oligomer (A-1), having a specific acid value, hydroxyl value and number average molecular weight, and obtained by reacting a compound having at least one hydroxyl group and at least one carboxyl group in a molecule thereof, a monoepoxide compound having a long-chain hydrocarbon group, and as necessary, a polyvalent carboxylic acid and/or polyvalent carboxylic acid anhydride, and/or a polyester resin (A-2) obtained by further reacting a polyvalent carboxylic acid and/or a polyvalent carboxylic acid anhydride and/or a polyisocyanate compound with the oligomer, and a crosslinking agent (B); and also discloses a method for forming a paint film using this paint.

16 Claims, No Drawings

THERMOSETTING AQUEOUS PAINT COMPOSITION

TECHNICAL FIELD

The present invention relates to an aqueous paint composition comprising a polyester oligomer and/or a polyester resin capable of forming a paint film having superior paint film performance and metallic or other finish, and to a method for forming a paint film using the aqueous paint composition.

BACKGROUND ART

In the field of paint, reduction of the amount of organic solvent used is becoming an important issue from the viewpoints of environmental protection and conservation of resources. In recent years, the development of aqueous paints and paints having a high solid content has proceeded as a countermeasure for reducing the amounts of organic solvents in paints.

As aqueous paints in the field of automobile paint, there are known thermosetting aqueous paints containing polyvalent carboxylic acid resins, amino resins, linear low molecular weight polyester diols and benzoin as the main components [see, for example, Japanese Patent Application Laid-open No. Hei 4 (1992)-93374]. However, these aqueous paints have a low solid concentration, inadequate smoothness and so on of the paint film, and inadequate paint film performance with respect to water resistance of the paint film and so on.

In the case of automobile paint in particular, the overcoating paint is required to be a paint film having superior quality in terms of appearance, and during the application of metallic paint, a paint film appearance having a superior metallic feeling and so on is required to be obtained by satisfactorily orientating a scaly, effect pigment such as aluminum in a metallic base paint.

A proposed example of an aqueous metallic base paint used for such a metallic coating is a base coat composition containing crosslinked polymer fine particles in an aqueous base paint that is capable of maximally demonstrating flip-flop effects of the metallic pigment while also forming a paint film having a superior metallic appearance [see, for example, Japanese Patent Publication No. Hei 3(1991)-14869]. However, this composition has the shortcoming of being susceptible to the occurrence of dripping, unevenness and other paint film defects due to changes in painting conditions, and particularly humidity.

In addition, in the case of double-coating, single-baking painting methods, although methods have been proposed for forming a paint film of a paint used to apply an aqueous metallic base that uses an aqueous dispersion in which a specific long-chain monomer such as stearyl acrylate or stearyl methacrylate is copolymerized in an aqueous dispersion containing polymer fine particles (see, for example, Japanese Patent Application Laid-open No. 2001-104878), this had the problems of having inadequate painting workability, smoothness and metallic feeling.

DISCLOSURE OF THE INVENTION

A main object of the present invention is to provide a thermosetting aqueous paint composition and a method for forming a paint film capable of forming a paint film having superior water resistance and other paint film performance, applicability to a wide range of painting work, a smooth paint surface and a superior metallic feeling.

The inventors of the present invention found that the above-mentioned object can be achieved by a thermosetting aqueous paint composition and method for forming a paint film using said composition that uses a novel oligomer or polyester resin obtained by a technique in which a polyester oligomer having a specific monomer composition is reacted or a polyvalent carboxylic acid (anhydride) is further reacted therewith, thereby leading to completion of the present invention.

Thus, the present invention provides a thermosetting aqueous paint comprising: (A) an oligomer (A-1) and/or a polyester resin (A-2) and (B) a crosslinking agent, wherein:

the oligomer (A-1) has a hydroxyl value within the range of 30 to 500 mgKOH/g, an acid value within the range of 20 to 200 mgKOH/g, and a number average molecular weight within the range of 300 to 2,000, and is at least one type of oligomer selected from an oligomer (A-1a), obtained by reacting a compound (a-1), having at least one hydroxyl group and at least one carboxyl group in a molecule thereof, and a monoepoxide compound (a-2) having a long-chain hydrocarbon group, and an oligomer (A-1b) obtained by further reacting a polyvalent carboxylic acid and/or polyvalent carboxylic acid anhydride (a-3) with the oligomer (A-1a); and the polyester resin (A-2) is a polyester resin obtained by further reacting a polyvalent carboxylic acid and/or polyvalent carboxylic acid anhydride (a-3) and/or a polyisocyanate compound (a-4) with the oligomer (A-1), having a hydroxyl value within the range of 10 to 300 mgKOH/g, an acid value within the range of 10 to 100 mgKOH/g, and a number average molecular weight within the range of 400 to 6,000.

In addition, the present invention provides a method for forming a multilayered paint film using the above-mentioned thermosetting aqueous paint composition.

Moreover, the present invention provides an oligomer (A-1) having a hydroxyl value within the range of 30 to 500 mgKOH/g, an acid value within the range of 20 to 200 mgKOH/g and a number average molecular weight within the range of 300 to 2,000, selected from an oligomer (A-1a), obtained by reacting a compound (a-1), having at least one hydroxyl group and at least one carboxyl group in a molecule thereof, and a monoepoxide compound (a-2) having a long-chain hydrocarbon group, and an oligomer (A-1b), obtained by further reacting a polyvalent carboxylic acid and/or polyvalent carboxylic acid anhydride (a-3) with the oligomer (A-1a).

Moreover, the present invention provides a polyester resin (A-2) having a hydroxyl value within the range of 10 to 300 mgKOH/g, an acid value within the range of 10 to 100 mgKOH/g and a number average molecular weight within the range of 400 to 6,000, obtained by reacting a polyvalent carboxylic acid and/or polyvalent carboxylic acid anhydride (a-3) and/or a polyisocyanate compound (a-4) with the above-mentioned oligomer (A-1).

The thermosetting aqueous paint composition of the present invention is able to form a paint film having a superior finish, water resistance and other paint film performance, is able to achieve a high solid content of the paint particularly in the case of using an aqueous metallic base coat paint, and is able to form a paint film having superior smoothness and metallic feeling. In addition, the thermosetting aqueous paint composition of the present invention demonstrates the effect of having applicability to a wide range of painting work with respect to fluctuations in temperature and humidity as compared with aqueous paints of the prior art.

The following provides a more detailed explanation of the thermosetting aqueous paint composition and method for forming a multilayered paint film of the present invention.

Thermosetting Aqueous Paint Composition

The thermosetting aqueous paint composition of the present invention (which may also be referred to as the "subject paint") contains (A) an oligomer (A-1) and/or a polyester resin (A-2), (B) a crosslinking agent, and as necessary, (C) water-dispersible polymer particles.

Oligomer (A-1)

The oligomer (A-1) used in the subject paint is a polyester oligomer selected from:

an oligomer (A-1a) obtained by reacting a compound (a-1), having at least one hydroxyl group and at least one carboxyl group in a molecule thereof, and a monoepoxide compound (a-2) having a long-chain hydrocarbon group, and an oligomer (A-1b) obtained by further reacting a polyvalent carboxylic acid and/or polyvalent carboxylic acid anhydride (a-3) with the oligomer (A-1a).

Oligomer (A-1a)

The oligomer (A-1a) can be synthesized by reacting the compound (a-1), having at least one hydroxyl group and at least one carboxyl group in a molecule thereof, and a monoepoxide compound (a-2), having a long-chain hydrocarbon group, in accordance with ordinary methods, such as by heating the components (a-1) and (a-2) in the presence of flowing nitrogen at a temperature of about 100 to about 160° C. for about 1 to 8 hours, and carrying out an esterification reaction of the carboxyl group in component (a-1) and the epoxy group in the component (a-2). At that time, a catalyst such as a quaternary ammonium salt compound in the manner of tetrabutyl ammonium bromide can be used as necessary as a catalyst.

Examples of the compound (a-1) having at least one, and preferably 1 to 3, hydroxyl groups, and at least one, and preferably 1 to 3, carboxyl groups in a molecule thereof include the compounds (1) to (4) indicated below.
(1) Compounds having one hydroxyl group and at least two, and preferably 2 or 3, carboxyl groups in a molecule thereof, examples of which include malic acid and citric acid.
(2) Compounds having at least two, and preferably 2 or 3, hydroxyl groups and at least two, and preferably 2 or 3, carboxyl groups in a molecule thereof, examples of which include tartaric acid.
(3) Compounds having at least two, and preferably 2 or 3, hydroxyl groups and one carboxyl group in a molecule thereof, examples of which include dimethylol propionic acid and dimethylol butanoic acid.
(4) Compounds having one hydroxyl group and one carboxyl group in a molecule thereof, examples of which include lactic acid.

These compounds (a-1) having at least one hydroxyl group and at least one carboxyl group in a molecule thereof can each be used alone or two more types can be used in combination.

In addition, the monoepoxide compound (a-2) having a long-chain hydrocarbon group includes monoepoxide compounds having a linear or cyclic hydrocarbon group containing 4 or more carbon atoms, preferably 6 to 20 carbon atoms, and more preferably 6 to 18 carbon atoms, specific examples of which include glycidyl esters of aliphatic carboxylic acids such as pivalic acid glycidyl ester, hexanoic acid glycidyl ester, cyclohexane carboxylic acid glycidyl ester, 2-ethylhexanoic acid glycidyl ester, isononaoic acid glycidyl ester, decanoic acid glycidyl ester, undecanoic acid glycidyl ester, lauric acid glycidyl ester, myristic acid glycidyl ester, palmitic acid glycidyl ester, stearic acid glycidyl ester and Cardura E10P (Japan Epoxy Resins Co., Ltd., neodecanoic acid monoglycidyl ester); alkyl glycidyl ethers such as butyl glycidyl ether and decyl glycidyl ether; aryl glycidyl ethers such as phenyl glycidyl ether; and α-olefin monoepoxides such as styrene oxide and AOEX 24 (Daicel Chemical Industries, Ltd., α-olefin monoepoxide mixture).

In addition, the above-mentioned hydrocarbon group having 4 or more carbon atoms may have a substituent such as a hydroxyl group, and specific examples of monoepoxide compounds having a hydrocarbon group having such a substituent include 1,2-epoxyoctanol and hydroxyoctyl glycidyl ether.

In addition, from the viewpoints of wettability and compatibility, component (a-2) is preferably a monoepoxide compound having a hydrocarbon group containing 6 to 20 carbon atoms, and a glycidyl ester compound having a hydrocarbon group containing 6 to 20 carbon atoms, and specifically Cardura E10P, is particularly preferable.

These monoepoxide compounds (a-2) having a long-chain hydrocarbon group can each be used alone or two or more types can be used in combination.

The oligomer (A-1a) can have a number average molecular weight typically within the range of 300 to 2,000, preferably 325 to 1,900 and more preferably 350 to 1,800, an acid value typically within the range of 20 to 200 mgKOH/g, preferably 25 to 175 mgKOH/g and more preferably 30 to 150 mgKOH/g, and a hydroxyl value typically within the range of 30 to 500 mgKOH/g, preferably 40 to 400 mgKOH/g and more preferably 50 to 300 mgKOH/g. Furthermore, if the hydroxyl value of the oligomer (A-1a) is less than 30 mgKOH/g, the curability of the finally obtained paint composition tends to be inadequate.

Furthermore, in the present description, "number average molecular weight" refers to the value of the number average molecular weight converted on the basis of the number average molecular weight of polystyrene obtained using a gel permeation chromatograph (Tosoh Corporation, HCL8120GPC) and using four columns consisting of the TSKgel G-4000HXL, TSKgel G-3000HXL, TSKgel G-2500HXL and TSKgel G-2000HXL (trade names, all available from Tosoh Corporation) under the conditions of a mobile phase of tetrahydrofuran, measurement temperature of 40° C., flow rate of 1 cc/minute and using an refractive index (RI) detector.

The ratio of the component (a-1) and component (a-2) used in the above-mentioned esterification reaction is selected to that the number average molecular weight, acid value and hydroxyl value of the resulting oligomer (A-1a) are within the ranges described above.

Oligomer (A-1b)

The oligomer (A-1b) can be synthesized by reacting the polyvalent carboxylic acid and/or polyvalent carboxylic acid anhydride (a-3) with the oligomer (A-1a) obtained in the manner described above by heating, for example, for about 0.5 to 6 hours at a temperature of about 100 to 185° C. and by further introducing acid groups into the oligomer (A-1a).

Compounds having at least two, and preferably 2 to 4, carboxyl groups in a molecule thereof are included in the polyvalent carboxylic acid of component (a-3), examples of which include phthalic acid, isophthalic acid, terephthalic acid, succinic acid, adipic acid, azelaic acid, sebacic acid, 2,4-diethylglutaric acid, naphthalene dicarboxylic acid, 4,4-diphenyl dicarboxylic acid, diphenylmethane-4,4-dicarboxylic acid, HET acid, maleic acid, fumaric acid, itaconic acid, trimellitic acid, pyromellitic acid, hexahydrophthalic acid, hexahydroisophthalic acid, hexahydroterephthalic acid, tetrahydrophthalic acid, hexahydromellitic acid and methylhexahydrophthalic acid, and these can each be used alone or two or more types can be used in combination.

Compounds having at least one, and preferably 1 to 2, acid anhydride groups in a molecule thereof are included in the polyvalent carboxylic acid anhydride of component (a-3), examples of which include anhydrides of the polyvalent carboxylic acids listed above. Here, since two carboxyl groups are formed from a single acid anhydride group, a single acid anhydride group is divalent or bifunctional.

The oligomer (A-1b) can have a number average molecular weight typically within the range of 300 to 2,000, preferably 325 to 1,900 and more preferably 350 to 1,800, an acid value typically within the range of 20 to 200 mgKOH/g, preferably 25 to 175 mgKOH/g and more preferably 30 to 150 mgKOH/g, and a hydroxyl value typically within the range of 30 to 500 mgKOH/g, preferably 40 to 400 mgKOH/g and more preferably 50 to 300 mgKOH/g. Furthermore, if the hydroxyl value of the oligomer (A-1b) is less than 30 mgKOH/g, the curability of the finally obtained paint composition tends to be inadequate.

The ratio of the amounts used of the component (a-1), the component (a-2) and the component (a-3) when synthesizing the oligomer (A-1b) is selected so that the number average molecular weight, acid value and hydroxyl value of the resulting oligomer (A-1b) are within the ranges described above.

Polyester Resin (A-2)

The polyester resin (A-2) used in the subject paint is a polyester resin obtained by reacting the polyvalent carboxylic acid and/or polyvalent carboxylic acid anhydride (a-3) and/or the polyisocyanate compound (a-4) with the polyester oligomer (A-1) obtained in the manner described above.

The reaction between the polyester oligomer (A-1) and the polyvalent carboxylic acid and/or polyvalent carboxylic acid anhydride (a-3) can be carried out by a condensing both of these components in accordance with ordinary methods, such as by heating for 1 to 10 hours in the presence of flowing nitrogen at a temperature of about 150 to 250° C. At that time, a known esterification catalyst can be used as a catalyst, examples of which include dibutyl tin oxide, antimony trioxide, zinc acetate, manganese acetate, cobalt acetate, calcium acetate, lead acetate, tetrabutyl titanate or tetraisopropyl titanate.

A compound previously described regarding the production of the oligomer (A-1b) can be similarly used for the component (a-3). In particular, a trifunctional or greater polyvalent carboxylic acid and/or polyvalent carboxylic acid anhydride is preferable for the component (a-3) in the polyester resin (A-2), and in the case of using the polyester resin (A-2) as a resin of the subject paint by using at least one type of compound selected from the group consisting trimellitic anhydride, ethylene glycol bis(anhydrotrimellitate), 1,3-propanediol bis(anhydrotrimellitate) and pyromellitic anhydride, the solid content of the paint can be increased, and a paint film can be obtained having a superior finish (and particularly, a superior metallic feeling and smoothness in the case of using as an aqueous metallic base coat paint). Moreover, a paint having applicability to a wide range of painting work with respect to fluctuations in temperature and humidity can be obtained.

In addition, the reaction between the oligomer (A-1) and the polyisocyanate compound (a-4) can be carried out by an addition reaction between the hydroxyl groups in the component (A-1) and the isocyanate groups in the component (a-4) in accordance with ordinary methods, such as by heating for 1 to 10 hours at a temperature of about 60 to 140° C. At that time, an organic metal-based catalyst to be described later (and particularly an organic tin catalyst) can be used as necessary as a catalyst.

In addition, acid groups can be further introduced into the polyester resin (A-2) by adding the component (a-3) either following completion of the above-mentioned addition reaction or before the addition reaction and reacting by heating for about 0.5 to 6 hours at a temperature of about 100 to 185° C. as necessary. At that time, a compound similar to those previously described with respect to production of the oligomer (A-1b) can be used for the component (a-3).

In the polyester resin (A-2), since polyester resins obtained by reacting the polyisocyanate compound (a-4) with the polyester oligomer (A-1) have urethane groups within the resin backbone, the physical properties of a paint film and so on formed there from can be improved.

Examples of the polyisocyanate compound (a-4) include aliphatic polyisocyanates such as hexamethylene diisocyanate, trimethyl hexamethylene diisocyanate, dimer acid diisocyanate and lysine diisocyanate, and Biuret type addition products and isocyanurate ring addition products of these polyisocyanates; alicyclic diisocyanates such as isophorone diisocyanate, 4,4'-methylenebis(cyclohexylisocyanate), methylcyclohexane-2,4- or 2,6-diisocyanate, 1,3- or 1,4-di(isocyanatomethyl)cyclohexane, 1,4-cyclohexane diisocyanate, 1,3-cyclopentane diisocyanate or 1,2-cyclohexane diisocyanate, and Biuret type addition products and isocyanurate ring addition products of these diisocyanates; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl) sulfone or isopropylidene bis(4-phenylisocyanate), and Biuret type addition products and isocyanurate ring addition products of these diisocyanates; polyisocyanates having 3 or more isocyanate groups in a molecule thereof such as triphenylmethane-4,4',4"-triisocyanate, 1,3,5-triisocyanatobenzene, 2,4,6-triisocyanatotoluene or 4,4'-dimethyl diphenylmethane-2,2',5,5'-tetraisocyanate, and Biuret type addition products and isocyanurate ring addition products of these polyisocyanates; and urethanation addition products obtained by reacting a polyisocyanate compound at a ratio such that the isocyanate groups are in excess with respect to the hydroxyl groups of a polyol such as ethylene glycol, propylene glycol, 1,4-butylene glycol, dimethylol propionic acid, polyalkylene glycol, trimethylol propane or hexanetriol, and Biuret type addition products and isocyanurate ring addition products of these urethanation addition products.

The resulting polyester resin (A-2) can typically have a number average molecular weight within the range of 400 to 6,000, preferably 500 to 5,000 and more preferably 1,000 to 4,000, a hydroxyl value typically within the range of 10 to 300 mgKOH/g, preferably 20 to 250 mgKOH/g and more preferably 30 to 200 mgKOH/g, and an acid value typically within the range of 10 to 100 mgKOH/g, preferably 15 to 90 mgKOH/g and more preferably 20 to 80 mgKOH/g. If the number average molecular weight of the polyester resin (A-2) is greater than 6,000, it becomes difficult to increase the solid content of a paint prepared using said polyester resin (A-2), while if the hydroxyl value is less than 10 mgKOH/g, the curability of the paint tends to be inadequate.

As previously described, although polyester resin (A-2) is obtained by condensing the polyester oligomer (A-1) with component (a-3) and/or component (a-4) to polymerize, the number average molecular weight thereof is preferably 400 to 2,000, and particularly preferably 700 to 1,600, larger than that of polyester oligomer (A-1).

The usage ratio of the component (A-1) and component (a-3) and/or (a-4) and the reaction conditions are adjusted so that the hydroxyl value, acid value and number average molecular weight of the resulting polyester resin (A-2) are within the ranges described above.

An aqueous composition containing the oligomer (A-1) or the polyester resin (A-2) can be prepared by respectively dissolving or dispersing the oligomer (A-1) and the polyester resin (A-2) in an aqueous medium normally containing 0.3 to 1.2 equivalents, and preferably 0.5 to 1.0 equivalents, of a basic compound with respect to the acid groups contained in each of these compounds. Examples of said basic compound include inorganic basic compounds such as hydroxides or alkaline metals or aqueous ammonia; and amine compounds such as methylamine, dimethylamine, trimethylamine, ethylamine, diethylamine, triethylamine, isopropylamine, diisopropylamine, diethylenetriamine, triethylenetetramine, monoethanolamine, diethanolamine, 2-amino-2-methylpropanol, morpholine, N-methylmorpholine, N-ethylmorpholine, piperazine, dimethyl ethanolamine, diethyl ethanolamine or dimethyl dodecylamine. Among these, triethylamine, dimethyl ethanolamine and diethyl ethanolamine are particularly preferable.

Crosslinking Agent (B)

There are no particular limitations on the crosslinking agent (B) used to cure the oligomer (A-1) and the polyester resin (A-2) in the subject paint, and examples thereof that can be used preferably include the blocked polyisocyanate curing agent ($b_1$), the water-dispersible blocked polyisocyanate curing agent ($b_2$) and the melamine resin ($b_3$) described below.

Blocked Polyisocyanate Curing Agent ($b_1$)

The blocked polyisocyanate curing agent ($b_1$) has the isocyanate groups of a polyisocyanate compound having two or more free isocyanate groups in a molecule thereof blocked with a blocking agent.

Examples of the above-mentioned polyisocyanate compound include aliphatic polyisocyanates such as hexamethylene diisocyanate, trimethyl hexamethylene diisocyanate, dimer acid diisocyanate and lysine diisocyanate, and Biuret type addition products and isocyanurate ring addition products of these aliphatic polyisocyanates; alicyclic diisocyanates such as isophorone diisocyanate, 4,4'-methylenebis(cyclohexylisocyanate), methylcyclohexane-2,4- or 2,6-diisocyanate, 1,3- or 1,4-di(isocyanatomethyl)cyclohexane, 1,4-cyclohexane diisocyanate, 1,3-cyclopentane diisocyanate or 1,2-cyclohexane diisocyanate, and Biuret type addition products and isocyanurate ring addition products of these alicyclic diisocyanates; aromatic diisocyanate compounds such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl) sulfone or isopropylidene bis(4-phenylisocyanate), and Biuret type addition products and isocyanurate ring addition products of these aromatic diisocyanates; hydrogenated MDI and derivatives of hydrogenated MDI; polyisocyanates having 3 or more isocyanate groups in a molecule thereof such as triphenylmethane-4,4',4"-triisocyanate, 1,3,5-triisocyanatobenzene, 2,4,6-triisocyanatotoluene or 4,4'-dimethyl diphenylmethane-2,2',5,5'-tetraisocyanate, and Biuret type addition products and isocyanurate ring addition products of these polyisocyanates; and urethanation addition products obtained by reacting a polyisocyanate compound at a ratio such that the isocyanate groups are in excess with respect to the hydroxyl groups of a polyol such as ethylene glycol, propylene glycol, 1,4-butylene glycol, dimethylol propionic acid, polyalkylene glycol, trimethylol propane or hexanetriol, and Biuret type addition products and isocyanurate ring addition products of these urethanation addition products.

In addition, the blocking agent temporarily blocks the free isocyanate groups in these polyisocyanate compounds, and when heated to, for example, 100° C. or higher and preferably 130° C. or higher, the blocking agent dissociates and the free isocyanate groups are regenerated, thereby enabling them to easily react with hydroxyl groups in the oligomer (A-1) and the polyester resin (A-2). Examples of the blocking agent include phenol-based blocking agents such as phenol, cresol, xylenol, nitrophenol, ethylphenol, hydroxydiphenyl, butyl phenol, isopropyl phenol, nonyl phenol, octyl phenol or methyl hydroxybenzoate; lactam-based blocking agents such as ε-caprolactam, δ-valerolactam, γ-butyrolactam or β-propiolactam; aliphatic alcohol-based blocking agents such as methanol, ethanol, propyl alcohol, butyl alcohol, amyl alcohol or lauryl alcohol; ether-based blocking agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether or methoxymethanol; benzyl alcohol; glycolic acid; glycolic acid ester-based blocking agents such as methyl glycolate, ethyl glycolate or butyl glycolate; lactic acid ester-based blocking agents such as lactic acid, methyl lactate, ethyl lactate or butyl lactate; alcohol-based blocking agents such as methylol urea, methylol melamine, diacetone alcohol, 2-hydroxyethyl acrylate or 2-hydroxyethyl methacrylate; oxime-based blocking agents such as formamidoxime, acetoamidoxime, acetoxime, methyl ethyl ketoxime, diacetyl monoxime, benzophenone oxime or cyclohexane oxime; active methylene-based blocking agents including malonic acid dialkyl esters such as dimethyl malonate, diethyl malonate, diisopropyl malonate, di-n-butyl malonate, diethyl methyl malonate, benzyl methyl malonate or diphenyl malonate, acetoacetic acid esters such as methyl acetoacetate, ethyl acetoacetate, isopropyl acetoacetate, n-propyl acetoacetate, benzyl acetoacetate or phenyl acetoacetate, and acetyl acetone; mercaptan-based blocking agents such as butyl mercaptan, t-butyl mercaptan, hexyl mercaptan, t-dodecyl mercaptan, 2-mercaptobenzothiazole, thiophenol, methyl thiophenol or ethyl thiophenol; acid amide-based blocking agents such as acetoanilide, acetanisidide, acetotoluid, acrylamide, methacrylamide, acetic acid amide, stearic acid amide or benzamide; imide-based blocking agents such as succinic acid imide, phthalic acid imide or maleic acid imide; amine-based blocking agents such as diphenylamine, phenylnaphthylamine, xylidine, N-phenylxylidine, carbazole, aniline, naphthylamine, butylamine, dibutylamine or butylphenylamine; imidazole-based blocking agents such as imidazole or 2-ethylimidazole; pyrazole-based blocking agents such as 3,5-dimethylpyrazole; urea-based blocking agents such as urea, thiourea, ethylene urea, ethylene thiourea or diphenyl urea; carbamic acid ester-based blocking agents such as phenyl N-phenylcarbamate; imine-based blocking agents such as ethyleneimine or propyleneimine; and sulfite-based blocking agents such as sodium bisulfite or potassium bisulfite.

Water-Dispersible Blocked Polyisocyanate Curing Agent ($b_2$)

From the viewpoint of reducing the amount of solvent contained in the paint (reducing the amounts of volatile organic compounds (VOC)), the amount of organic solvent in the crosslinking agent (B) is also preferably reduced, and in order to accomplish this, a blocked polyisocyanate curing agent ($b_2$) can be used in which water dispersibility has been imparted to the blocked polyisocyanate curing agent ($b_1$) within a range that does not lower the performance of the paint film.

Blocked polyisocyanate compounds, in which water dispersibility has been imparted by blocking isocyanate groups of the polyisocyanate compound with a blocking agent and hydroxymonocarboxylic acid and neutralizing introduced carboxyl groups that have been introduced by the hydroxymonocarboxylic acid, are included in the blocked polyisocyanate curing agent ($b_2$) imparted with water dispersibility.

Although the same polyisocyanate compounds as those listed for the blocked polyisocyanate curing agent ($b_1$) can be used for the above-mentioned polyisocyanate compounds, hexamethylene diisocyanate (HMDI), derivatives of hexamethylene diisocyanate (HMDI), isophorone diisocyanate (IPDI), derivatives of isophorone diisocyanate (IPDI), hydrogenated MDI and derivatives of hydrogenated MDI are particularly preferable.

The water-dispersible blocked polyisocyanate curing agent ($b_2$) can be produced by blocking the isocyanate groups of the polyisocyanate compound with a blocking agent together with reacting with a hydroxymonocarboxylic acid. At that time, the reaction is carried out such that at least one isocyanate group of the polyisocyanate compound is added to a hydroxyl group of the hydroxymonocarboxylic acid.

The same blocking agents listed for the blocked polyisocyanate curing agent ($b_1$) can be used for the blocking agent. In addition, examples of hydroxymonocarboxylic acids include 2-hydroxyacetic acid, 3-hydroxypropanoic acid, 12-hydroxy-9-octadecanoic acid (ricinoleic acid), 3-hydroxy-2,2-dimethylpropanoic acid (hydroxypivalic acid) and 2,2-dimethylolpropionic acid (DMPA). Among these, 3-hydroxy-2,2-dimethylpropanoic acid (hydroxypivalic acid) is particularly preferable. The reaction can be carried out in an inert solvent with respect to the isocyanate groups, examples of which include ketones such as acetone or methyl ethyl ketone; esters such as ethyl acetate; and N-methylpyrrolidone (NMP).

Melamine Resin ($b_3$)

Examples of the melamine resin ($b_3$) include di-, tri-, tetra-, penta- and hexamethylol melamines and alkyl ether forms thereof (with examples of the alkyl portion including methyl, ethyl, propyl, isopropyl, butyl, isobutyl and 2-ethylhexyl alcohol), while examples of commercially available products that can be used include members of the Cymel Series, such as Cymel 254 available from Nippon Cytec, and members of the Yuban series, such as Yuban 20SB available from Mitsui Chemicals.

In addition, in the case of using the melamine resin ($b_3$) as a curing agent, a sulfonic acid such as para-toluene sulfonic acid, dodecylbenzene sulfonic acid or dinonylnaphthalene sulfonic acid, and salts thereof with amines that dissociate at the baking temperature of the paint film, can be used as a catalyst.

Water-Dispersible Polymer Particles (C)

There are no particular limitations on the water-dispersible polymer particles (C), able to be contained as necessary in the thermosetting aqueous paint composition of the present invention, and particles similar to those used in ordinary aqueous resin compositions can be used. Preferable examples include aqueous dispersions of acrylic resin, polyester resin (including alkyd resin), epoxy resin and urethane resin, and each of these more preferably has a hydroxyl group or carboxyl group and so on in the molecular structure thereof.

Among these, water-dispersible acrylic polymer particles (C-1) and water-dispersible urethane polymer particles (C-2) described below are particularly preferable, and are optimum for in aqueous base coat paint applications.

Water-Dispersible Acrylic Polymer Particles (C-1)

The water-dispersible acrylic polymer particles (C-1) are obtained by emulsification polymerization of a vinyl monomer using a radical polymerization initiator in the presence of a dispersion stabilizer such as a surfactant.

The water-dispersible acrylic polymer particles (C-1) may have an ordinary homogeneous structure or a multilayer structure such as a core/shell structure. In addition, the particles may or may not be internally crosslinked. In the case of a core/shell structure, the core or the shell portion may be internally crosslinked while the other is not internally crosslinked, or both the core and the shell portion may be internally crosslinked or not internally crosslinked.

The vinyl monomer subjected to emulsification polymerization is preferably selected from a carboxyl group-containing vinyl monomer (M-1), a hydroxyl group-containing vinyl monomer (M-2) and other vinyl monomer (M-3). Moreover, internally crosslinked, water-dispersible acrylic polymer particles can be obtained by, for example, a method that also uses a small amount of a polyvinyl compound (M-4) having two or more polymerizable unsaturated bonds in a molecule thereof; a method that uses small amounts of a vinyl monomer having a glycidyl group in a molecule thereof and a carboxyl group-containing vinyl monomer (M-1); or, a method that uses small amounts of a hydroxyl group-containing vinyl monomer (M-2) and a vinyl monomer having an isocyanate group in a molecule thereof.

The water-dispersible acrylic polymer particles (C-1) having a core/shell structure can be specifically obtained by, for example, first emulsification polymerizing a vinyl monomer component not containing or hardly containing the carboxyl group-containing vinyl monomer (M-1), and then carrying out emulsification polymerization after adding a vinyl monomer component containing a large amount of the carboxyl group-containing vinyl monomer (M-1).

The water-dispersible acrylic polymer particles (C-1) having a core/shell structure of the crosslinked core type can specifically be obtained by, for example, first emulsification polymerizing a small amount of the polyvinyl compound (M-4) and a vinyl monomer component not containing or hardly containing the carboxyl group-containing vinyl monomer (M-1), and then carrying out emulsification polymerization after adding a vinyl monomer component containing a large amount of the carboxyl group-containing vinyl monomer (M-1).

Bonding between the core and shell portions can be carried out by, for example, copolymerizing a vinyl monomer component containing the carboxyl group-containing vinyl monomer (M-1) with polymerizable unsaturated bonds introduced by means of a hydrolysable functional group or silanol group present on the surface of the core portion or polymerizable unsaturated bonds derived from aryl(meth)acrylate remaining on the surface of the core portion (thereby resulting in formation of the shell portion).

Compounds having at least one carboxyl group and one polymerizable unsaturated bond in a molecule thereof are included in the carboxyl group-containing vinyl monomer (M-1), examples of which include acrylic acid, methacrylic acid, crotonic acid, maleic acid and itaconic acid. Moreover, acid anhydrides and semi-esterified monocarboxylic acids of these compounds are also included in the monomer (M-1) in the present description.

Compounds having one hydroxyl group and polymerizable unsaturated bond each in a molecule thereof are included in the hydroxyl group-containing vinyl monomer (M-2), and this hydroxyl group functions as a function group that reacts with a crosslinking agent. Specific preferable examples of this monomer (M-2) include monoester forms of acrylic acid or methacrylic acid and divalent alcohols having 2 to 10 carbon atoms, examples of which include 2-hydroxyethyl acrylate, 2-hydroxyethyl methacrylate, hydroxypropyl acrylate, hydroxypropyl methacrylate, hydroxybutyl acrylate and hydroxybutyl methacrylate.

The other vinyl monomer (M-3) refers to a monomer other than the above-mentioned monomers (M-1) and (M-2), and includes compounds having one polymerizable unsaturated bond in a molecule thereof, specific examples of which are listed in (1) to (8) below.

(1) Monoester forms of acrylic acid or methacrylic acid and a monovalent alcohol having 1 to 20 carbon atoms, examples of which include methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate and lauryl methacrylate.

(2) Aromatic vinyl monomers, examples of which include styrene, a-methyl styrene and vinyl toluene.

(3) Glycidyl group-containing vinyl monomers, examples of which include compounds having one glycidyl group and one polymerizable unsaturated bond each in a molecule thereof, specific examples of which include glycidyl acrylate and glycidyl methacrylate.

(4) Nitrogen-containing alkyl acrylates (having 1 to 20 carbon atoms), examples of which include dimethylaminoethyl acrylate and dimethylaminoethyl methacrylate.

(5) Polymerizable unsaturated bond-containing amide compounds, examples of which include acrylic acid amide, methacrylic acid amide, N,N-dimethyl acrylamide, N-butoxymethyl acrylamide, N-methylol acrylamide, N-methylol methacrylamide and diacetone acrylamide.

(6) Vinyl compounds, examples of which include vinyl acetate, vinyl propionate and vinyl chloride.

(7) Polymerizable unsaturated bond-containing nitrile compounds, examples of which include acrylonitrile and methacrylonitrile.

(8) Diene compounds, examples of which include butadiene and isoprene.

These other vinyl monomers (M-3) can each be used alone or two or more types can be used in combination.

Examples of the above-mentioned polyvinyl compound (M-4) include ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinyl benzene, trimethylol propane triacrylate and methylenebisacrylamide. In each of these compounds, there is preferably not a large difference in the reactivity of two or more unsaturated bonds contained therein, although the above-mentioned diene compounds are not included.

On the other hand, examples of dispersion stabilizers used in emulsification polymerization include anionic emulsifiers, nonionic emulsifiers and amphoteric emulsifiers. Specific examples of anionic emulsifiers include fatty acids, alkyl sulfuric acid esters, alkyl benzene sulfonic acid salts and alkyl phosphoric acid salts, specific examples of nonionic emulsifiers include polyoxyethylene alkyl ethers, polyoxyethylene alkyl allylethers, polyoxyethylene derivatives, sorbitan fatty acid esters, polyoxyethylene sorbitan fatty acid esters, polyoxyethylene alkyl amines and alkyl alkanol amines, and specific examples of amphoteric emulsifiers include alkylbetaines.

The concentration of these emulsifiers is normally within the range of 0.1 to 10% by weight, and preferably 1 to 5% by weight, based on the solid content weight of the water-dispersible acrylic polymer particles.

In addition, examples of radical polymerization initiators include ammonium persulfate and 4,4'-azobis(4-cyanobutanoic acid), the amount of initiator used is normally within the range of 0.01 to 10% by weight, and preferably 0.1 to 5% by weight, based on the solid content weight of the water-dispersible acrylic polymer particles.

The reaction temperature during emulsification polymerization can normally be 60 to 90° C. and the reaction time can be roughly 5 to 10 hours.

From the viewpoint of water resistance and curability of the formed paint film, the resulting water-dispersible acrylic polymer particles (C-1) suitably have a hydroxyl value typically within the range of 1 to 100 mgKOH/g and preferably 5 to 80 mgKOH/g. In addition, from the viewpoint of water resistance and curability of the formed paint film, the water-dispersible acrylic polymer particles (C-1) suitably have an acid value typically within the range of 1 to 100 mgKOH/g and preferably 5 to 80 mgKOH/g. Moreover, the water-dispersible acrylic polymer particles (C-1) can typically have a particle diameter within the range of 10 to 1,000 nm and preferably 20 to 500 nm.

The water-dispersible acrylic polymer particles (C-1) are preferably neutralized with a basic compound. Examples of neutralizers that can be used for the water-dispersible acrylic polymer particles (C-1) include ammonia or water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine and morpholine.

Water-Dispersible Urethane Polymer Particles (C-2)

The water-dispersible urethane polymer particles (C-2) are, for example, those commonly used in the field of paints for the purpose of improving stress relaxation effects and other physical properties of paint films, and in the case of, for example, using in automotive applications, demonstrate the effects of improving resistance to chipping of a paint film caused by flying stones when a vehicle is in motion (referred to as anti-chipping performance) and improving adhesion.

The water-dispersible urethane polymer particles (C-2) can be obtained by, for example, dispersing or dissolving in water a urethane polymer obtained by reacting an active hydrogen-containing compound, a compound having an active hydrogen group and hydrophilic group in a molecule thereof, and an organic polyisocyanate compound.

Examples of active hydrogen-containing compounds include high molecular weight polyols, low molecular weight polyols and polyamines [as described in, for example, Japanese Patent Application Laid-open No. Hei 3(1991)-9951].

High molecular weight polyols include polyether polyols, polyester polyols and polycarbonate polyols. These high molecular weight polyols can normally have an OH group equivalent within the range of 200 to 3,000 and preferably 250 to 2,000. Examples of low molecular weight polyols include 1,4-butanediol, 3-methylpentanediol, pentaerythritol and trimethylol propane, while examples of polyamines include hexamethylene diamine, isophorone diamine, N-hydroxyethylethylene diamine and 4,4'-diaminodicyclohexylmethane.

Compounds having an active hydrogen and hydrophilic group in a molecule thereof are preferably compounds containing an active hydrogen and an anion or anion-forming group, examples of which include dihydroxycarboxylic acids (such as α,α'-dimethylol propionic acid or α,α'-dimethylol butyric acid), dihydroxysulfonic acid compounds (such as sodium 3-(2,3-dihydroxypropoxy)-1-propane sulfonate) and diaminocarboxylic acids (such as diaminobenzoic acid), and examples of basic compounds for neutralizing these compounds include organic bases (such as triethylamine or trimethylamine) and inorganic bases (such as sodium hydroxide or potassium hydroxide).

Examples of organic polyisocyanate compounds include isophorone diisocyanate (IPDI), hexamethylene diisocyanate (HDI), 4,4'-dicyclohexylmethane diisocyanate (hydrogenated MDI), 2,4- and/or 2,6-tolylene diisocyanate (TDI), 4,4'-diphenylmethane diisocyanate (MDI) and α,α,α',α'-tetramethylxylylene diisocyanate (TMXDI).

In producing the above-mentioned urethane polymer, the reaction between the active hydrogen-containing compound, the compound having an active hydrogen group and hydrophilic group in a molecule thereof, and the organic polyisocyanate compound can be carried out by a one-shot method in which each component is reacted all at once, or a multi-step method in which, for example, a portion of the active hydrogen-containing compound (such as a high molecular weight polyol) is reacted with the compound having an active hydrogen group and a hydrophilic group in a molecule thereof and the organic polyisocyanate compound to form a prepolymer having an isocyanate terminal, followed by reacting with the remainder of the active hydrogen-containing compound.

The above-mentioned reaction can normally be carried out at 40 to 140° C. and preferably 60 to 120° C. The reaction can be carried out in organic solvent inert with respect to isocyanate (such as acetone, toluene or dimethylformamide), and the organic solvent may be added during the reaction or after the reaction.

The water-dispersible urethane polymer particles (C-2) can be obtained in the form of an aqueous dispersion by neutralizing the urethane polymer having a hydrophilic group obtained in the manner described above with a basic compound to form anionic groups followed by dispersing or dissolving in water.

In addition, when dispersing or dissolving the urethane polymer in water, an anionic and/or nonionic surfactant can also be used as necessary.

The thermosetting aqueous paint composition of the present invention can be prepared by, for example, producing an aqueous varnish by dissolving or dispersing the oligomer (A-1) and/or the polyester resin (A-2) in an aqueous medium containing a neutralizing base, and adding the crosslinking agent (B), and the water-dispersible polymer particles (C) as necessary, thereto and dispersing therein. At that time, the neutralizing base can normally be used at a pH of the thermosetting aqueous paint composition within the range of 7 to 9.

There are no strict limitations on the blending ratio of the oligomer (A-1) and/or polyester resin (A-2), crosslinking agent (B), and water-dispersible polymer particles (C) added as necessary, in the thermosetting aqueous paint composition of the present invention, and the blending ratio can be varied over a wide range corresponding to the application of the paint composition. However, the oligomer (A-1) and/or the polyester resin (A-2) can be within the range of 5 to 80% by weight, preferably 5 to 70% by weight and more preferably 5 to 60% by weight, the crosslinking agent (B) can be within the range of 10 to 60% by weight, preferably 20 to 55% by weight and more preferably 20 to 45% by weight, and the water-dispersible polymer particles (C) can be within the range of 0 to 80% by weight, preferably 0 to 70% by weight and more preferably 0 to 60% by weight, based on the total solid content of components (A), (B) and (C).

In addition to the above-mentioned components (A), (B) and (C), other resins can also be contained in the thermosetting aqueous paint composition of the present invention. Preferable examples of these other resins include an acrylic resin, polyester resin, urethane-modified polyester resin and epoxy resin, with the acrylic resin and polyester resin described below being particularly preferable.

Acrylic Resin

The acrylic resin is an acrylic resin able to be synthesized by copolymerizing radical polymerizable monomers in accordance with ordinary methods, and that synthesized by solution polymerization can be used preferably. Organic solvents able to be used in solution polymerization are preferably hydrophilic organic solvents such as propylene glycol-based and dipropylene glycol-based solvents. In addition, from the viewpoint of water dispersivity, the acrylic resin preferably has an acid group such as a carboxyl group.

Known monomers can be used for the radical polymerizable monomers, examples of which include hydroxyl group-containing radical polymerizable monomers, carboxyl group-containing radical polymerizable monomers and other radical polymerizable monomers.

Examples of hydroxyl group-containing radical polymerizable monomers include 2-hydroxyethyl (meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate and phthalic acid monohydroxyethyl (meth)acrylate.

Examples of carboxyl group-containing radical polymerizable monomers include acrylic acid and methacrylic acid.

Examples of other radical polymerizable monomers include styrene, methyl (meth)acrylate, ethyl (meth)acrylate, butyl (meth)acrylate, 2-ethylhexyl (meth)acrylate, lauryl (meth)acrylate, cyclohexyl (meth)acrylate, cyclohexenyl (meth)acrylate, phenoxyethyl (meth)acrylate, phenoxypolyethylene glycol (meth)acrylate, dicyclopentenyl (meth)acrylate, dicyclopentenyloxyethyl (meth)acrylate, isobornyl (meth)acrylate, benzyl (meth)acrylate, Aronix M110 (Toagosei), N-methylol (meth)acrylamide, N-butoxy (meth)acrylamide, acryloyl morpholine, dimethylaminoethyl (meth)acrylate, N-vinyl-2-pyrrolidone and γ-acryloxypropyl trimethoxysilane.

Furthermore, in the above-mentioned description, "(meth)acrylate" refers to "acrylate or methacrylate".

The acrylic resin preferably has a number average molecular weight typically within the range of 1,000 to 200,000 and preferably 2,000 to 100,000. In addition, the acrylic resin can typically have a hydroxyl value within the range of 10 to 250 mgKOH/g and preferably 30 to 150 mgKOH/g, and have an acid value typically within the range of 10 to 100 mgKOH/g and preferably 20 to 60 mgKOH/g.

Polyester Resin

The polyester resin is a polyester resin other than the polyester resin (A-2) of the present invention able to be synthesized by a known method normally consisting of esterifying a polybasic acid and a polyvalent alcohol.

The polybasic acid is a compound having at least two carboxyl groups in a molecule thereof, examples of which include phthalic acid, isophthalic acid, terephthalic acid, succinic acid, adipic acid, azelaic acid, sebacic acid, tetrahydrophthalic acid, hexahydrophthalic acid, HET acid, maleic acid, fumaric acid, itaconic acid, trimellitic acid and anhydrides thereof, while the polyvalent alcohol is a compound having at least two hydroxyl groups in a molecule thereof, examples of which include ethylene glycol, propylene glycol, butylene glycol, hexanediol, diethylene glycol, dipropylene glycol, neopentyl glycol, triethylene glycol, glycerin, trimethylol ethane, trimethylol propane and pentaerythritol.

In addition, fatty acid-modified polyester resins modified with a (semi) dry oily fatty acid such as linseed oil fatty acid, coconut oil fatty acid, safflower oil fatty acid, soybean oil fatty acid, sesame oil fatty acid, perilla oil fatty acid, hemp oil fatty acid, tall oil fatty acid or dehydrated castor oil fatty acid can also be used for the polyester resin. Typically, the amount modified by these fatty acids is preferably 30% by weight or less in terms of the oil length. In addition, the polyester resin may also be the result of partially reacting a monobasic acid such as benzoic acid. In addition, in order to introduce an acid group into the polyester resin, for example, after esterifying the polybasic acid and polyvalent alcohol, a polybasic acid or anhydride thereof, such as trimellitic acid or trimellitic anhydride, can be further reacted.

The polyester resin can preferably have a weight average molecular weight typically within the range of 1,000 to 200,000 and preferably 2,000 to 50,000. In addition, the polyester resin can have a hydroxyl value typically within the range of 10 to 250 mgKOH/g and preferably 30 to 150 mgKOH/g, and an acid value typically within the range of 10 to 100 mgKOH/g and preferably 20 to 60 mgKOH/g.

Ordinary paint additives, such as a pigment, curing catalyst, ultraviolet absorber, photostabilizer, surface adjuster, anti-degradation agent, anti-run agent or anti-precipitation agent can be contained as necessary in the thermosetting aqueous paint composition of the present invention.

Examples of pigment include colored pigments such as titanium oxide, zinc oxide, carbon black, cadmium red, molybdenum red, chrome yellow, chrome oxide, Prussian blue, cobalt blue, azo pigments, phthalocyanine pigments, quinacridone pigments, isoindoline pigments, threne pigments or perylene pigments; extender pigments such as talc, clay, kaolin, baryta, barium sulfate, barium carbonate, calcium carbonate, silica or alumina white; and effect pigments such as aluminum powder, mica powder and mica powder coated with titanium oxide.

In the case of using the thermosetting aqueous paint composition of the present invention as an aqueous base coat paint having metallic specifications, an effect pigment and, as necessary, a colored pigment can be added. In the case of using as an intermediate coating, an extender pigment such as barium sulfate, calcium carbonate or clay can be used in combination with a colored pigment. Pigment can be added to an aqueous varnish along with other components after preparing a pigment paste by using a portion of the above-mentioned resin. In preparing the pigment paste, commonly used additives such as antifoaming agents, dispersants or surface adjusters can also be suitably used as necessary.

The blended amount of the pigment is suitably within the range of typically 1 to 250 parts by weight and particularly 3 to 150 parts by weight per 100 parts by weight of the total solid content of the components (A), (B) and (C) in the paint composition.

In addition, a curing catalyst can also be incorporated, and examples of curing catalysts include organic metal, acidic and basic compounds.

Examples of organic metal compounds include tetraisopropyl titanate, tetrabutyl titanate, lithium acetate, iron (III) acetylacetate, zinc 2-ethylhexanoate, copper acetate, vanadium trioxide, tin octylate, dibutyl tin diacetate, dibutyl tin dioctoate, dibutyl tin dilaurate, dibutyl tin dimalate, tetrabutyl tin, dibutyl tin oxide, tetra-n-butyl-1,3-diacetyloxydistannoxane, tetra-n-propyl-1,3-diacetyloxydistannoxane and tetra-n-butyl-1,3-dilauryloxydistannoxane, with organic tin compounds such as tin octylate, dibutyl tin diacetate, dibutyl tin dilaurate and distannoxanes being used preferably, and in the case of requiring low-temperature baking, dibutyl tin diacetate being used more preferably.

Examples of acidic compounds include paratoluene sulfonic acid, dodecylbenzene sulfonic acid, dinonylnaphthalene sulfonic acid, dinonylnaphthalene disulfonic acid, butylphosphoric acid and octylphosphoric acid, and amine-neutralized forms of these acids are used preferably.

Examples of basic compounds include compounds such as trimethylamine, triethylamine, dimethylcyclohexylamine, N-tetramethylhexane-1,6-diamine, N-pentamethyldiethylene triamine and 2-methyl-1,4-diazabicyclo[2,2,2]octane.

The compounds described above can each be used alone or in a combination of two or more types for the curing catalyst. Although varying according to the type of curing catalyst, the amount of curing catalyst used is preferably about 0.05 to 5 parts by weight to 100 parts by weight of the total solid content of the components (A), (B) and (C) in the paint composition.

A known ultraviolet absorber can be used for the ultraviolet absorber, examples of which include benzotriazole-based absorbers, triazine-based absorbers, salicylic acid derivative-based absorbers and benzophenone-based absorbers.

In the case of containing an ultraviolet absorber, the content thereof in the paint composition in terms of weather resistance and yellowing resistance is preferably within the range of 0.1 to 10 parts by weight, particularly preferably 0.2 to 5 parts by weight and more preferably 0.3 to 2 parts by weight to 100 parts by weight of the total solid content of the components (A), (B) and (C).

A known photostabilizer can be used for the photostabilizer, examples of which include hindered amine-based photostabilizers.

In the case of containing a photostabilizer, the content thereof in the paint composition in terms of weather resistance and yellowing resistance is preferably within the range of 0.1 to 10 parts by weight, particularly preferably 0.2 to 5 parts by weight and more preferably 0.3 to 2 parts by weight to 100 parts by weight of the total solid content of the components (A), (B) and (C).

Paint Film Formation Method

Although there are no particular limitations on the painted article to which the subject paint can be applied, and preferable examples thereof include the bodies of various vehicles such as automobiles, motorcycles and trucks. In addition, painted articles include steel sheets that form these bodies, such as cold rolled steel sheets, zinc-plated steel sheets, zinc alloy-plated steel sheets, stainless steel sheets and copper-plated steel sheets; metal base materials such as aluminum sheets and aluminum alloy sheets; and various types of plastic materials.

In addition, the painted articles may be subjected to phosphate treatment, chromate treatment, compound oxide treatment or other surface treatment on the metal surfaces of the above-mentioned vehicle bodies and metal base materials.

Moreover, the painted articles may also have an undercoating paint film and/or intermediate coating paint film such as various types of electrodeposition paints formed on the above-mentioned vehicle bodies and metal base materials.

There are no particular limitations on the method used to apply the subject paint, with examples including air spraying, air-less spraying, rotary atomization and curtain coating, and these coating methods can be used to form a wet paint film. These coating methods may be used to apply the subject paint electrostatically as necessary. Among these methods, air spraying and electrostatic coating are particularly preferable. The amount of the paint composition applied is preferably about 10 to 70 μm and particularly preferably about 10 to 40 μm as the cured film thickness.

In addition, in the case of applying by air spray coating, air-less spray coating or rotary atomization, the viscosity of the paint composition is suitably adjusted to be within a viscosity range suitable for the type of coating suitably using an organic solvent and/or water, and normally is preferably adjusted to within a viscosity range of about 15 to 60 seconds at 20° C. as measured with a Ford cup #4 viscometer.

Curing of the wet paint film is carried out by heating after having applied the thermosetting aqueous paint composition to a painted article.

Heating can be carried out by a known heating method. For example, heating can be carried out using a drying oven such as a hot air oven, electric oven or infrared induction heating oven. The heating temperature is suitably within the range of normally 80 to 180° C. and preferably 100 to 160° C. Although there are no particular limitations on the heating time, it can normally be about 20 to 40 minutes.

The subject paint can preferably be used as an automobile paint, and can be used particularly preferably as an intermediate coating or colored overcoating base coat paint.

In the case of using as an intermediate coating paint, a multilayered paint film can be formed using a double-coating, double-baking system by, for example, applying the subject paint to an electrostatically coated painted article and curing the paint film, followed by applying an overcoating paint to the cured paint film and curing that overcoating paint.

In the case of using as a colored overcoating base coat paint, a multilayered paint film can be formed using a double-coating, single-baking system by, for example, applying the subject paint to a painted article subjected to electrostatic coating and/or intermediate coating and applying a clear coat to the paint film without curing the paint film, followed by simultaneously curing the base coat and the clear coat.

In addition, a multilayered paint film can also be formed by a triple-coating, single-baking system by applying the subject paint in the form of an intermediate coating to a painted article, applying the subject paint in the form of a colored overcoating base coat paint to the paint film without curing the paint film, and additionally applying a clear coat paint to the paint film without curing the paint film followed by simultaneously baking the three layers of paint films.

A known, non-curing type of clear coat paint can be used for the clear coat paint used above, specific examples of which include organic solvent-diluted paints comprising a suitable combination of a base resin such as an alkyd resin, polyester resin, acrylic resin, silicon resin, fluorine resin or urethane resin, and a curing agent such as an amino resin, polyisocyanate compound, blocked polyisocyanate compound, polycarboxylic acid or acid anhydride thereof or reactive silane compound, corresponding to reactive functional groups contained by the base resin. Those compounds previously described for the crosslinking agent (B), for example, can be used for the above-mentioned polyisocyanate compound and blocked polyisocyanate compound. In addition, the clear coat paint is preferably a high solid paint that uses a small amount of organic solvent from the viewpoints of environmental issues and conservation of resources, and aqueous paints and powdered paints can also be used.

Examples of clear coat paints that can be used particularly preferably include acrylic resin/melamine resin-based, acrylic resin/polyisocyanate curing agent-based, acrylic resin/blocked polyisocyanate curing agent-based and acid group-containing resin/epoxy group-containing resin-based clear coat paints.

The following provides a more detailed explanation of the present invention through examples and comparative examples thereof. However, the present invention is not limited to these examples. Furthermore, the terms "parts" and "%" are both based on weight, while the thicknesses paint films refer to the thickness of the cured paint film.

EXAMPLES

Production of Oligomer (A-1)

Example 1

148 parts of dimethylol butanoic acid and 245 parts of Cardura E10P (Japan Epoxy Resins Co., Ltd.; neodecanoic acid monoglycidyl ester) were charged into a reactor equipped with a stirrer, reflux condenser, water separator and thermometer and reacted for 3 hours at 120° C. Subsequently, 154 parts of hexahydrophthalic anhydride were added thereto and reacted for 3 hours at 120° C. to obtain an oligomer 1 having a hydroxyl value of 205 mgKOH/g, acid value of 102 mgKOH/g and number average molecular weight of 550.

Example 2

90 parts of lactic acid and 245 parts of Cardura E10P were charged into a reactor equipped with a stirrer, reflux condenser, water separator and thermometer and reacted for 3 hours at 120° C. Subsequently, 77 parts of hexahydrophthalic anhydride were added thereto and reacted for 3 hours at 120° C. to obtain an oligomer 2 having a hydroxyl value of 204 mgKOH/g, acid value of 68 mgKOH/g and number average molecular weight of 420.

Example 3

192 parts of citric acid and 490 parts of Cardura E10P (Japan Epoxy Resins Co., Ltd.; neodecanoic acid monoglycidyl ester) were charged into a reactor equipped with a stirrer, reflux condenser, water separator and thermometer and reacted for 3 hours at 120° C. to obtain an oligomer 3 having a hydroxyl value of 247 mgKOH/g, acid value of 82 mgKOH/g and number average molecular weight of 700.

Example 4

134 parts of malic acid and 245 parts of Cardura E10P (Japan Epoxy Resins Co., Ltd.; neodecanoic acid monoglycidyl ester) were charged into a reactor equipped with a stirrer, reflux condenser, water separator and thermometer and reacted for 3 hours at 120° C. to obtain an oligomer 4 having a hydroxyl value of 296 mgKOH/g, acid value of 148 mgKOH/g and number average molecular weight of 380.

Example 5

150 parts of tartaric acid and 490 parts of Cardura E10P (Japan Epoxy Resins Co., Ltd.; neodecanoic acid monoglycidyl ester) were charged into a reactor equipped with a stirrer, reflux condenser, water separator and thermometer and reacted for 3 hours at 120° C. Subsequently, 154 parts of hexahydrophthalic anhydride were added thereto and reacted for 3 hours at 120° C. to obtain an oligomer 5 having a hydroxyl value of 212 mgKOH/g, acid value of 70 mgKOH/g and number average molecular weight of 800.

Production of Polyester Resin (A-2)

Example 6

134 parts of dimethylol propionic acid and 245 parts of Cardura E10P were charged into a reactor equipped with a stirrer, reflux condenser, water separator and thermometer and reacted for 3 hours at 120° C. Subsequently, 96 parts of trimellitic anhydride were added thereto and reacted for 4 hours at 160° C. to obtain a polyester resin 1 having a hydroxyl value of 264 mgKOH/g, acid value of 50 mgKOH/g and number average molecular weight of 1,500.

Example 7

192 parts of citric acid and 490 parts of Cardura E10P were charged into a reactor equipped with a stirrer, reflux condenser, water separator and thermometer and reacted for 3 hours at 120° C. Subsequently, the components were further reacted for 4 hours after raising the temperature to 230° C. Furthermore, 96 parts of trimellitic anhydride were added thereto and reacted for 3 hours at 160° C. to obtain a polyester resin 2 having a hydroxyl value of 87 mgKOH/g, acid value of 50 mgKOH/g and number average molecular weight of 1,900.

Example 8

192 parts of citric acid and 490 parts of Cardura E10P were charged into a reactor equipped with a stirrer, reflux condenser, water separator and thermometer and reacted for 3 hours at 120° C. Subsequently, after cooling the reaction mixture to 80° C., 78 parts of isophorone diisocyanate were added thereto and reacted for 6 hours at 80° C. Furthermore, 115 parts of trimellitic anhydride were added and reacted for 1 hour at 180° C. to obtain a polyester resin 3 having a hydroxyl value of 67 mgKOH/g, acid value of 80 mgKOH/g and number average molecular weight of 1,600.

Example 9

134 parts of malic acid and 490 parts of Cardura E10P were charged into a reactor equipped with a stirrer, reflux condenser, water separator and thermometer and reacted for 4 hours at 120° C. Subsequently, 96 parts of trimellitic anhydride were added thereto and reacted for 3 hours at 160° C. to obtain a polyester resin 4 having a hydroxyl value of 166 mgKOH/g, acid value of 49 mgKOH/g and number average molecular weight of 1,700.

Example 10

96 parts of citric acid, 67 parts of malic acid and 490 parts of Cardura E10P were charged into a reactor equipped with a stirrer, reflux condenser, water separator and thermometer and reacted for 3 hours at 120° C. Subsequently, the components were further reacted for 4 hours after raising the temperature to 230° C. Furthermore, 96 parts of trimellitic anhydride were added thereto and reacted for 3 hours at 160° C. to obtain a polyester resin 5 having a hydroxyl value of 124 mgKOH/g, acid value of 48 mgKOH/g and number average molecular weight of 1,800.

Example 11

Comparative Example 95.6 parts of trimethylol propane, 120.4 parts of 1,6-hexanediol, 169.4 parts of hexahydrophthalic anhydride, 60 parts of succinic anhydride and 68.6 parts of Cardura E10P were charged into a reactor equipped with a stirrer, reflux condenser, water separator and thermometer, and after raising the temperature from 160 to 230° C. over the course of 3 hours, were reacted for 4 hours at 230° C. Next, 42.2 parts of trimellitic anhydride were added thereto to add carboxyl groups to the resulting reaction product followed by reacting for 1 hour at 180° C. to obtain polyester resin 6 having a hydroxyl value of 118 mgKOH/g, acid value of 49 mgKOH/g and number average molecular weight of 1,700.

Example 12

Comparative Example 79.2 parts of trimethylol propane, 134.5 parts of 1,6-hexanediol, 246.4 parts of hexahydrophthalic anhydride, 35 parts of adipic acid and 68.6 parts of Cardura E10P were charged into a reactor equipped with a stirrer, reflux condenser, water separator and thermometer, and after raising the temperature from 160 to 230° C. over the course of 3 hours, were reacted for 4 hours at 230° C. Next, 46.1 parts of trimellitic anhydride were added thereto to add carboxyl groups to the resulting reaction product followed by reacting for 1 hour at 180° C. to obtain polyester resin 7 having a hydroxyl value of 59 mgKOH/g, acid value of 40 mgKOH/g and number average molecular weight of 3,150.

Production of Crosslinking Agent (B)

Production Example 1

605 parts of Sumizur N-3300 (Sumitomo Bayer Urethane Co., Ltd., polyisocyanurate containing an isocyanurate structure, number average molecular weight: approx. 600, isocyanurate content: 21.6%), 413 parts of diethyl malonate and 181 parts of ethyl acetate were blended in a reaction apparatus equipped with a thermometer, thermostat, stirrer, reflux condenser and dropping pump followed by the addition of 7.0 parts of a methanol solution containing 28% sodium hydroxide in the presence of flowing nitrogen and holding for 12 hours at 60° C. Subsequent measurement of the NCO value yielded an isocyanurate content of 0.2%. 99 parts of ethyl acetate were then added thereto to obtain a resin solution. 505 parts of this resin solution were transferred to a different reaction apparatus of the same type followed by the addition of 450 parts of propylene glycol monopropyl ether and heating to 90° C. The solvent was then distilled off under reduced pressure over the course of 2 hours while holding the temperature of the system at 80 to 90° C. to obtain 624 parts of a blocked polyisocyanate curing agent solution. 42 parts of ethanol were contained in a simple solvent removal trap. The resulting blocked polyisocyanate curing agent solution was diluted with propylene glycol monopropyl ether to obtain a blocked polyisocyanate curing agent solution 1 having a solid content of 80%. The number average molecular weight of this blocked polyisocyanate curing agent was about 3,500.

Production of Water-Dispersible Polymer
Particles (C)

Production Example 2

145 parts of deionized water and 1.2 parts of Newcol 562SF (*1) were charged into a reaction vessel equipped with a thermometer, thermostat, stirrer, reflux condenser and dropping apparatus followed by stirring and mixing in the presence of flowing nitrogen and heating to 80° C. Next, 1% of the total amount of a monomer emulsion 1 described below and 5.2 parts of a 3% aqueous ammonium persulfate solution were introduced into the reactor and held at 80° C. for 15 minutes. Subsequently, the remainder of the monomer emulsion 1 was dropped into the reaction vessel over the course of 3 hours followed by aging for 1 hour following completion of dropping. Subsequently, a monomer emulsion 2 described below and 1.5 parts of a 3% aqueous ammonium persulfate solution were dropped in over the course of 2 hours and after aging for 1 hour, 89 parts of 1.5% aqueous dimethylethanolamine solution were gradually added to the reaction vessel while cooling to 30° C. followed by discharging while filtering with a 100 mesh Nylon cloth to obtain water-dispersible acrylic polymer particles 1 (solid content: 25.2%) having a mean particle diameter of 100 nm (as measured at 20° C. after diluting with deionized water using the Coulter Model N4 Submicron Particle Size Distribution Analyzer (Beckman-Coulter), acid value of 30.7 mgKOH/g and hydroxyl value of 22.1 mgKOH/g.

(*1) Newcol 562SF: trade name, Nippon Nyukazai Co., Ltd., ammonium polyoxyethylene alkyl benzene sulfonate, active ingredient: 60%.

Monomer Emulsion 1: 94.3 parts of deionized water, 17 parts of methyl methacrylate, 80 parts of n-butyl acrylate, 3 parts of allyl methacrylate and 1.2 parts of Newcol 562SF were mixed and stirred to obtain a monomer emulsion 1.

Monomer Emulsion 2: 39 parts of deionized water, 15.4 parts of methyl methacrylate, 2.9 parts of n-butyl acrylate, 5.9 parts of hydroxyethyl acrylate, 5.1 parts of methacrylic acid and 0.5 parts of Newcol 562SF were mixed and stirred to obtain a monomer emulsion 2.

Production of Thermosetting Aqueous Paint
(Aqueous Overcoating Base Coat Paint)

Example 13

43.8 parts of Cymel 325 (Mitsui Cytec, Ltd., methyl/butyl mixed ether type melamine resin, solid content: 80%) and 178.6 parts of the water-dispersible acrylic polymer particles 1 obtained in Production Example 2 (solid content: 25.2%) were added to 20 parts of the oligomer 1 obtained in Example 1 while stirring. Subsequently, an aluminum pigment component in the form of Alumipaste GX180A (Asahi Kasei Corporation, aluminum flake paste) was added in an amount equivalent to 20 parts while stirring followed by mixing and dispersing, and dimethylethanolamine and deionized water were added followed by adjusting to a pH of 8.0 and viscosity of 40 seconds at 20° C. as measured using a Ford Cup No. 4 to obtain an aqueous overcoating base coat paint 1.

Example 14

An aqueous overcoating base coat paint 2 was obtained using the same procedure as Example 13 with the exception of using the oligomer 2 obtained in Example 2 instead of the oligomer 1 in Example 13.

Example 15

An aqueous overcoating base coat paint 3 was obtained using the same procedure as Example 13 with the exception of using the oligomer 3 obtained in Example 3 instead of the oligomer 1 in Example 13.

Example 16

An aqueous overcoating base coat paint 4 was obtained using the same procedure as Example 13 with the exception of using the oligomer 4 obtained in Example 4 instead of the oligomer 1 in Example 13.

Example 17

An aqueous overcoating base coat paint 5 was obtained using the same procedure as Example 13 with the exception of using the oligomer 5 obtained in Example 5 instead of the oligomer 1 in Example 13.

Example 18

An aqueous overcoating base coat paint 6 was obtained using the same procedure as Example 13 with the exception of using the polyester resin 1 obtained in Example 6 instead of the oligomer 1 in Example 13.

Example 19

An aqueous overcoating base coat paint 7 was obtained using the same procedure as Example 13 with the exception of using the polyester resin 2 obtained in Example 7 instead of the oligomer 1 in Example 13.

Example 20

An aqueous overcoating base coat paint 8 was obtained using the same procedure as Example 13 with the exception of using the polyester resin 3 obtained in Example 8 instead of the oligomer 1 in Example 13.

Example 21

An aqueous overcoating base coat paint 9 was obtained using the same procedure as Example 13 with the exception of using the polyester resin 4 obtained in Example 9 instead of the oligomer 1 in Example 13.

Example 22

An aqueous overcoating base coat paint 10 was obtained using the same procedure as Example 13 with the exception of using the polyester resin 5 obtained in Example 10 instead of the oligomer 1 in Example 13.

Example 23

An aqueous overcoating base coat paint 11 was obtained using the same procedure as Example 13 with the exception of changing the amount of Cymel 325 from the 43.8 parts in Example 13 to 31.3 parts, and adding 25 parts of Superflex 410 (trade name, Dai-ichi Kogyo Seiyaku Co., Ltd., aqueous polycarbonate-based urethane resin liquid, solid content: 40%).

Example 24

An aqueous overcoating base coat paint 12 was obtained using the same procedure as Example 15 with the exception of changing the amount of Cymel 325 from the 43.8 parts in Example 15 to 31.3 parts, and adding 25 parts of Superflex 410 (trade name, Dai-ichi Kogyo Seiyaku Co., Ltd., aqueous polycarbonate-based urethane resin liquid, solid content: 40%).

Example 25

An aqueous overcoating base coat paint 13 was obtained using the same procedure as Example 15 with the exception of changing the amount of oligomer 3 from 20 parts in Example 15 to 10 parts, and adding 25 parts of Superflex 410.

Example 26

An aqueous overcoating base coat paint 14 was obtained using the same procedure as Example 15 with the exception of changing the amount of the water-dispersible acrylic polymer particles 1 from 178.6 parts in Example 15 to 138.9 parts, and adding 25 parts of Superflex 410.

Example 27

An aqueous overcoating base coat paint 15 was obtained using the same procedure as Example 15 with the exception of changing the amount of oligomer 3 from 20 parts in Example 15 to 10 parts, changing the amount of Cymel 325 from 43.8 parts to 31.3 parts, and adding 12.5 parts of the blocked polyisocyanate curing agent solution 1 (solid content: 80%) obtained in Production Example 1 and 25 parts of Superflex 410.

Example 28

An aqueous overcoating base coat paint 16 was obtained using the same procedure as Example 24 with the exception of changing the amount of the oligomer 3 from 20 parts in Example 24 to 10 parts, and adding 10 parts of the polyester resin 2 obtained in Example 7.

Comparative Example 1

An aqueous overcoating base coat paint 17 was obtained using the same procedure as Example 13 with the exception of using the polyester resin 6 obtained in Example 11 instead of the oligomer 1 in Example 13.

Comparative Example 2

An aqueous overcoating base coat paint 18 was obtained using the same procedure as Example 13 with the exception of using the polyester resin 7 obtained in Example 12 instead of the oligomer 1 in Example 13.

Test Sheet Production 1

Test sheets were respectively produced in the manner described below for the aqueous overcoating base coat paints 1 to 18 obtained in Examples 13 to 28 and Comparative Examples 1 and 2.

Elecron 9600 (trade name, Kansai Paint Co., Ltd., thermosetting epoxy resin cationic electrodeposition paint) was coated by electrodeposition onto a dull steel sheet having a thickness of 0.8 mm subjected to zinc phosphate chemical treatment to a film thickness of 20 μm followed by curing by heating for 30 minutes at 170° C., air spraying Amilac TP-65-2 (trade name, Kansai Paint Co., Ltd., polyester-melamine resin-based automotive intermediate coating paint) thereon to a thickness of 35 μm and heating and curing for 30 minutes at 140° C. to obtain a coated article.

Each of the aqueous overcoating base coat paints 1 to 18 produced in the above-mentioned examples and comparative examples was then coated onto the coated article to a film thickness of 15 μm using a rotary electrostatic coater at a discharge volume of 300 cc, rotating speed of 25,000 rpm, shaping air pressure of 1.5 kg/cm$^2$, gun distance of 30 cm, conveyor speed of 5 m/min and booth temperature and humidity of 25° C. and 75%, respectively, followed by allowing to stand for 2 minutes and preheating for 3 minutes at 80° C.

Next, Magicron TC-71 (trade name, Kansai Paint Co., Ltd., acrylic-melamine resin-based overcoating clear paint) was adjusted to a viscosity of 30 seconds at a paint temperature of 20° C. by adding Swasol 1000 (Cosmo Oil Co., Ltd., petroleum-based aromatic hydrocarbon solvent) using a Ford Cup # 4 viscometer, and then coated onto this uncured base coat paint to a film thickness of 40 μm using a Minibell rotary electrostatic sprayer at a discharge volume 200 cc, rotating speed of 40,000 rpm, shaping air pressure of 1 kg/cm$^2$, gun distance of 30 cm, conveyor speed of 4.2 m/min, and booth temperature and humidity of 25° C. and 75%, respectively, followed by allowing to stand for 7 minutes and heating for 30 minutes at 140° C. to simultaneously cure both of the films and produce a test sheet.

Performance Test Results 1

The results of performance tests on each of the test sheets formed in the manner described above and aqueous overcoating base coat paints 1 to 18 are shown in Tables 1 and 2. The testing and evaluation methods are described below.

Paint Film Smoothness:

The appearance of the paint films was evaluated visually.

○: Good smoothness, luster and clarity

Δ: Somewhat inferior smoothness, luster and clarity x: Considerably inferior smoothness, luster and clarity IV Value:

IV values were measured using a laser-type metallic feeling measurement apparatus (Alcope LMR-200, Kansai Paint Co., Ltd.). IV value represents the brightness of a metallic paint film. Since a metallic paint becomes brighter the greater the degree to which it is uniformly oriented in parallel with a coated surface, the higher the IV value, the better the metallic feeling and the greater the brightness.

Metallic Unevenness:

The state of the metallic unevenness of each test sheet was evaluated visually.

○: No metallic unevenness

Δ: Some metallic unevenness x: Considerable metallic unevenness

Paint Solid Component:

Approximately 2 g of paint were sampled and placed in an aluminum foil cup having a diameter of about 5 cm followed by measuring the weight density of the solid component (%) (solid component measurement conditions: measured after drying for 1 hour at 110° C.).

TABLE 1

|  | Examples | | | | | | | | | |
|---|---|---|---|---|---|---|---|---|---|---|
|  | 13 | 14 | 15 | 16 | 17 | 18 | 19 | 20 | 21 | 22 |
| Aqueous overcoating base coat paint | 1 | 2 | 3 | 4 | 5 | 6 | 7 | 8 | 9 | 10 |
| Paint film smoothness | ◯ | ◯ | ◯ | ◯ | ◯ | ◯ | ◯ | ◯ | ◯ | ◯ |
| IV value | 281 | 273 | 293 | 274 | 277 | 261 | 265 | 254 | 260 | 262 |
| Metallic unevenness | ◯ | ◯ | ◯ | ◯ | ◯ | ◯ | ◯ | ◯ | ◯ | ◯ |
| Paint solid component | 26 | 25 | 27 | 26 | 26 | 24 | 24 | 22 | 23 | 23 |

TABLE 2

|  | Examples | | | | | | Comparative Examples | |
|---|---|---|---|---|---|---|---|---|
|  | 23 | 24 | 25 | 26 | 27 | 28 | 1 | 2 |
| Aqueous overcoating base coat paint | 11 | 12 | 13 | 14 | 15 | 16 | 17 | 18 |
| Paint film smoothness | ◯ | ◯ | ◯ | ◯ | ◯ | ◯ | Δ | Δ |
| IV value | 279 | 290 | 280 | 292 | 275 | 278 | 200 | 190 |
| Metallic unevenness | ◯ | ◯ | ◯ | ◯ | ◯ | ◯ | Δ | Δ |
| Paint solid component | 25 | 26 | 24 | 30 | 24 | 23 | 20 | 18 |

Test Sheet Production 2

Two types of test sheets were produced for the aqueous overcoating base coat paints obtained in Example 15 and Comparative Example 1 according to the procedures described in Example 29 and Comparative Example 3 below.

Example 29

Elecron 9600 (trade name, Kansai Paint Co., Ltd., thermosetting epoxy resin cationic electrodeposition paint) was coated by electrodeposition onto a dull steel sheet having a thickness of 0.8 mm subjected to zinc phosphate chemical treatment to a film thickness of 20 μm followed by heating for 30 minutes at 170° C. for form an electrodeposition paint film that was used as a paint article.

WP-300T (polyester resin/polyisocyanate curing agent-based aqueous intermediate coating paint, Kansai Paint Co., Ltd.) was coated onto this coated article to a film thickness of 35 μm. After allowing to stand for 2 minutes, the coated article was preheated for 5 minutes at 80° C. after which the aqueous overcoating base coat paint 3 produced in Example 3 was coated onto this uncured intermediate coated surface to a film thickness of 15 μm using a rotary electrostatic coater at a discharge volume of 300 cc, rotating speed of 25,000 rpm, shaping air pressure of 1.5 kg/cm$^2$, gun distance of 30 cm, conveyor speed of 5 m/min and booth temperature and humidity of 25° C. and 75%, respectively, followed by allowing to stand for 2 minutes and preheating for 3 minutes at 80° C.

Next, Magicron TC-71 (trade name, Kansai Paint Co., Ltd., acrylic-melamine resin-based overcoating clear paint) was adjusted to a viscosity of 30 seconds at a paint temperature of 20° C. by adding Swasol 1000 using a Ford Cup # 4 viscometer, and then coated onto this uncured base coat paint surface to a film thickness of 40 μm using a Minibell rotary electrostatic sprayer at a discharge volume 200 cc, rotating speed of 40,000 rpm, shaping air pressure of 1 kg/cm$^2$, gun distance of 30 cm, conveyor speed of 4.2 m/min, and booth temperature and humidity of 25° C. and 75%, respectively, followed by allowing to stand for 7 minutes and heating for 30 minutes at 140° C. to simultaneously cure the three layers of paint films and produce a test sheet.

Comparative Example 3

A test sheet was produced in the same manner as Example 29 with the exception of using the aqueous overcoating base coat paint 17 obtained in Comparative Example 1 instead of the aqueous overcoating base coat paint 3 used in the above-mentioned Example 29.

Performance Test Results 2

The results of performance tests on the two test sheets produced in the manner described above are shown in Table 3. The testing and evaluation methods were the same as those described in Performance Test Results 1.

TABLE 3

|  | Example 29 | Comparative Example 3 |
|---|---|---|
| Aqueous overcoating base coat paint | 3 | 17 |
| Paint film smoothness | ◯ | Δ |
| IV value | 268 | 194 |
| Metallic unevenness | ◯ | X |

The invention claimed is:

1. A thermosetting aqueous paint comprising: a polyester resin (A-2) and a crosslinking agent (B),
   wherein the polyester resin (A-2) has a hydroxyl value within the range of 10 to 300 mgKOH/g, an acid value within the range of 10 to 100 mgKOH/g, and a number average molecular weight within the range of 400 to 6,000, and is a polyester resin obtained by reacting a polyvalent carboxylic acid and/or polyvalent carboxylic acid anhydride (a-3) and/or a polyisocyanate compound (a-4) with an oligomer (A-1),
   wherein the oligomer (A-1) has a hydroxyl value within the range of 30 to 500 mgKOH/g, an acid value within the range of 20 to 200 mgKOH/g, and a number average molecular weight within the range of 300 to 2,000, and is obtained by reacting a compound (a-1) having at least one hydroxyl group and at least one carboxyl group in a molecule thereof, and a monoepoxide compound (a-2) having a long-chain hydrocarbon group, and wherein the number average molecular weight of the polyester resin (A-2) is larger than that of the polyester oligomer (A-1) by 400 to 2,000.

2. The thermosetting aqueous paint according to claim 1, wherein the compound (a-1) is at least one type of compound selected from the group consisting of citric acid, malic acid, tartaric acid, dimethylol propionic acid, dimethylol butanoic acid and lactic acid.

3. The thermosetting aqueous paint according to claim 1, wherein the monoepoxide compound (a-2) is a monoepoxide compound having a hydrocarbon group having 6 to 20 carbon atoms.

4. The thermosetting aqueous paint according to claim 1, wherein the oligomer (A-1) is an oligomer having an acid value within the range of 25 to 175 mgKOH/g, a hydroxyl value within the range of 40 to 400 mgKOH/g, and a number average molecular weight within the range of 325 to 1900.

5. The thermosetting aqueous paint according to claim 1, wherein the polyvalent carboxylic acid and/or polyvalent carboxylic acid anhydride (a-3) is at least one type of compound selected from the group consisting of phthalic acid, isophthalic acid, terephthalic acid, succinic acid, adipic acid, azelaic acid, sebacic acid, 2,4-diethylglutaric acid, naphthalene dicarboxylic acid, 4,4-diphenyl dicarboxylic acid, diphenylmethane-4,4-dicarboxylic acid, HET acid, maleic acid, fumaric acid, itaconic acid, trimellitic acid, pyromellitic acid, hexahydrophthalic acid, hexahydroisophthalic acid, hexahydroterephthalic acid, tetrahydrophthalic acid, hexahydromellitic acid, methylhexahydrophthalic acid and anhydrides thereof.

6. The thermosetting aqueous paint according to claim 1, wherein the polyvalent carboxylic acid and/or polyvalent carboxylic acid anhydride (a-3) used to produce the polyester resin (A-2) is at least one type of compound selected from the group consisting of trimellitic anhydride, ethylene glycol bis (anhydrotrimellitate), 1,3-propanediol bis(anhydrotrimellitate) and pyromellitic anhydride.

7. The thermosetting aqueous paint according to claim 1, wherein the polyester resin (A-2) is an oligomer having a hydroxyl value within the range of 20 to 250 mgKOH/g, an acid value within the range of 15 to 90 mgKOH/g, and a number average molecular weight within the range of 500 to 5000.

8. The thermosetting aqueous paint according to claim 1, wherein the crosslinking agent (B) is selected from the group consisting of a blocked polyisocyanate curing agent ($b_1$), a water-dispersible blocked polyisocyanate curing agent ($b_2$) and a melamine resin ($b_3$).

9. The thermosetting aqueous paint according to claim 1, further comprising water-dispersible polymer particles (C).

10. The thermosetting aqueous paint according to claim 9, wherein the water-dispersible polymer particles (C) are water-dispersible acrylic polymer particles (C-1) or water-dispersible urethane polymer particles (C-2), having an acid value within the range of 1 to 100 mgKOH/g and a hydroxyl value within the range of 1 to 100 mgKOH/g.

11. The thermosetting aqueous paint according to claim 9, comprising as non-volatile components 5 to 80% by weight of component (A), 10 to 60% by weight of component (B) and 0 to 80% by weight of component (C) based on the total solid content of components (A), (B) and (C).

12. A method for forming a multilayered paint film, comprising:
coating the thermosetting aqueous paint according to claim 1 as an intermediate coating paint onto a painted article followed by curing, further coating an overcoating paint onto the cured paint film and performing curing.

13. A method for forming a multilayered paint film, comprising:
coating the thermosetting aqueous paint according to claim 1 as a base coat paint onto a painted article, further coating a clear coat paint onto the uncured paint film, and curing the base coat and clear coat simultaneously.

14. A method for forming a multilayered paint film, comprising:
coating the thermosetting aqueous paint according to claim 1 as an intermediate coating paint onto a painted article, coating the thermosetting aqueous paint according to claim 1 as a base coat paint onto the uncured paint film, further coating a clear coat paint onto that uncured paint film, and curing the three layers of the intermediate coat, base coat and clear coat simultaneously.

15. The method for forming a multilayered paint film according to claim 13, wherein the clear coat paint is an acrylic resin/melamine resin-based, acrylic resin/polyisocynate curing agent-based, acrylic resin/blocked polyisocyanate curing agent-based or acid group-containing resin/epoxy group-containing resin-based paint.

16. A painted article coated using the method according to claim 12.

* * * * *